(12) United States Patent
Ren et al.

(10) Patent No.: US 8,308,016 B2
(45) Date of Patent: Nov. 13, 2012

(54) NON-STICK COOKING UTENSIL

(75) Inventors: Luquan Ren, Jilin Province (CN);
Xiaoming Qiu, Jilin Province (CN);
Qingping Liu, Jilin Province (CN);
Guilan Zhang, Jilin Province (CN);
Zhanrong Cui, Jilin Province (CN);
Hongxiu Yang, Jilin Province (CN);
Liang Ge, Jilin Province (CN)

(73) Assignee: Jilin University, Changchun (CN)

( * ) Notice: Subject to any disclaimer, the term of this patent is extended or adjusted under 35 U.S.C. 154(b) by 1371 days.

(21) Appl. No.: 10/597,507

(22) PCT Filed: Sep. 24, 2004

(86) PCT No.: PCT/CN2004/001095
§ 371 (c)(1),
(2), (4) Date: Feb. 5, 2007

(87) PCT Pub. No.: WO2005/074766
PCT Pub. Date: Aug. 18, 2005

(65) Prior Publication Data
US 2008/0105689 A1    May 8, 2008

(30) Foreign Application Priority Data

Feb. 2, 2004  (CN) .......................... 2004 1 0106587

(51) Int. Cl.
*B65D 1/34*  (2006.01)

(52) U.S. Cl. .................. 220/573.2; 220/573.1

(58) Field of Classification Search ............... 220/573.2, 220/573.1, 608
See application file for complete search history.

(56) References Cited

U.S. PATENT DOCUMENTS

| | | | | |
|---|---|---|---|---|
| 2,618,258 | A | * | 11/1952 | Kroyer ......................... 126/390.1 |
| 3,473,952 | A | * | 10/1969 | McFadden ..................... 428/164 |
| 5,447,803 | A | * | 9/1995 | Nagaoka et al. ............... 428/698 |
| 5,921,173 | A | * | 7/1999 | Grycan et al. .................. 99/422 |
| 6,613,430 | B2 | * | 9/2003 | Culbertson et al. ........... 428/352 |

FOREIGN PATENT DOCUMENTS

| | | |
|---|---|---|
| CN | U 2119167 | 10/1992 |
| CN | Y 2253945 | 5/1997 |
| CN | Y 2432866 | 6/2001 |
| CN | Y 2568083 | 8/2003 |

* cited by examiner

*Primary Examiner* — Stephen Castellano
(74) *Attorney, Agent, or Firm* — Michael Best & Friedrich LLP

(57) ABSTRACT

The invention relates to a non-stick cooking utensil, wherein protrusions are arranged on interior wall of the utensil to form a non-smooth surface, said protrusion has a height of 20-999 μm and a projection area of 314-783431 μm² with respect to the interior surface of the utensil, the protrusions are so distributed that the total projection area of protrusions on the surface of the interior wall is about 10%-60% of the surface area, a coating film is formed on said non-smooth surface with protrusions. As compared with utensils with smooth surface, the sticking intensity and stickiness between foods and the utensil of present invention may be decreased by 60%-80%.

5 Claims, 2 Drawing Sheets

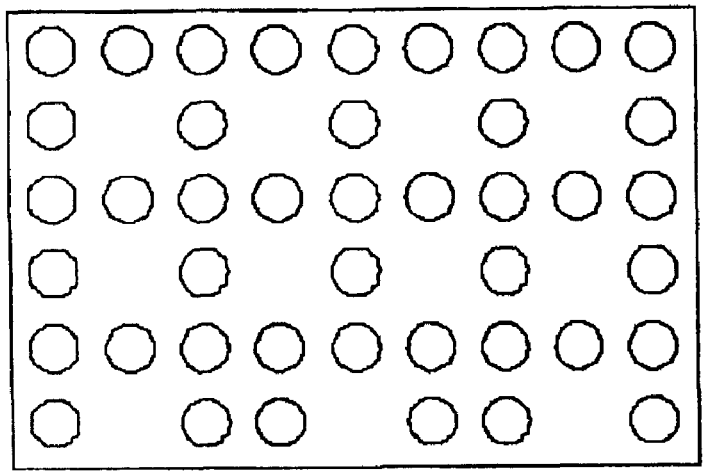
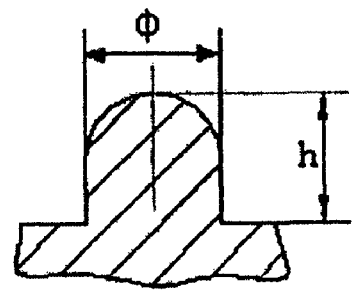
Fig. 6
Fig. 5
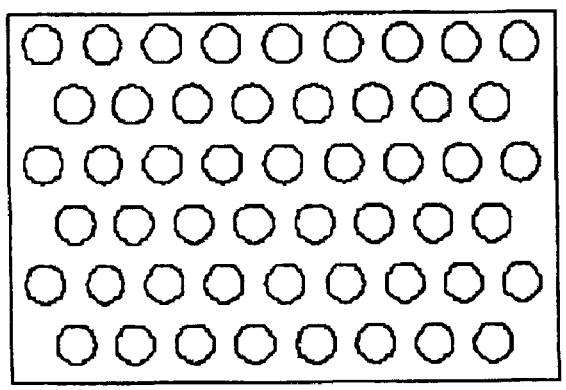
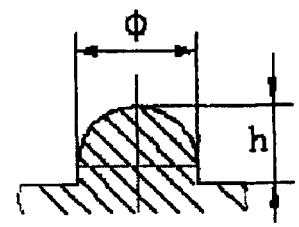
Fig. 8
Fig. 7

NON-STICK COOKING UTENSIL

FIELD OF THE INVENTION

The invention relates to cooking utensils, and more particularly to non-stick cooking utensils used in a kitchen.

BACKGROUND OF THE INVENTION

Because of being easy to clean and convenient to use, non-stick cooking utensils have been one of the products preferred by consumers when buying cooking utensils, especially by the newly-married and hard-working white-collar workers. With the development of the product and the maturation of consumerism, non-stick cooking utensils will have enormous market potential and be likely to replace ordinary kitchen cooking utensil. Therefore, non-stick cooking utensil products have potential market space and a rich market profit margin.

In 1955, the first non-stick pan in the world was born in France. When French Engineer Mark Gregoire was looking for the new purpose of Teflon, his wife suggested coating a cooking utensil with this material. In this way the food would not stick to the cooking utensil, so Gregoire made the first non-stick pan and founded Teflon food company-tefare company.

Since the 1960s, non-stick cooking utensils have begun to enter into households, and in developed countries in Europe and the U.S.A, non-stick cooking utensils have entered into thousands of homes. The dissemination rate was so high that by 1999, the American non-stick market sale scale reached $1.019 billion, equal to about 8.5 billion RMB, and about 200 million people had 30 million non-stick cooking utensil products.

In the 1980s, non-stick cooking utensils entered Chinese homes. Because of a good-looking shape, novel, non-stick, non-paste, easy cleaning and easy washing features, non-stick cooking utensils are liked by a great number of consumers and have been "the darling" among modern cooking utensils.

The main principle of non-stick pans is to spread the surface of the aluminum alloy cooking utensil bodies with non-stick dope composed mainly of Polytetrafluoroethylene. After being sintered at a high temperature of 420 degrees Centigrade, a non-stick coat is closely adhered to the aluminum base material. Because of strong chemistry inertia, food is separated from the cooking utensil body by the non-stick coat, so the cooking utensil has the effect of non-stick. In the non-stick cooking utensil market of China and abroad, the non-stick dope used more frequently includes Teflon, CCC, Coflon, and especially Teflon produced by the biggest chemistry-industry corporation throughout the world (Dupont Company, USA). Although there are lots of trade names for the non-stick coat, the main composition thereof is the same, i.e., Polytetrafluoroethylene (for short, 4F, PTFE), a composite macromolecule material. With a number of non-stick cooking utensil products entering households, people begin to worry about the security of the non-stick coat.

In 2001, one of the top magazines in science circles—the English "Nature"—published papers by scientist Marbury and his partners in Toronto, Canada. It claimed the coat of non-stick cooking utensils is made of Teflon, Teflon containing fluoride decomposed into Triflouroacetic acid etc., among which there is alleged to be potential poison and light poison that could possibly pollute the environment after entering into the atmosphere. According to the news of Sina Net Science and Technology of May 17, 2003, an American environmental protection team presented a report to a consumer product security committee which claimed that filmed products mainly composed of 4F, PTFE (e.g., non-stick cooking utensils) could possibly harm human health. This environmental protection group said these products will set out 15 kinds of poisonous gas and chemical matter that include two kinds of carcinogens when used under 700 degrees Centigrade within 3 or 5 minutes. An inside Dupont company research report said non-stick cooking utensils set out poisonous atoms that could kill birds when used under 464 degrees Centigrade. Because non-stick cooking utensils could harm birds and could possibly harm humans this environmental protection group said to stick a label of "possibly poisonous" to non-stick cooking utensils. On Nov. 15, 2003, a CCTV news broadcast reported that American scientific researchers discovered that Teflon widely used to make non-stick cooking utensils can cause cancer after long use, so we should develop new non-stick technology and materials as soon as possible. These research results will make many people worry and look at our non-stick cooking utensils in hand carefully.

SUMMARY OF THE INVENTION

It is an object of the present invention to provide a non-stick cooking utensil harmless to human beings and the environment.

Research and observation on some bio-surfaces (for example, dung beetle shells, lotus leaf surfaces) with the function of stick-reducing, stick-preventing and self-cleaning revealed that if the surface makes contacts with sticky and wet material, the water on the surface will go off quickly, indicating strong water repellence and small attraction between the body surface matter and water molecules, which is one of the most important reasons that biology bodies take on the stick-preventing function. Further research into biological surface structure and shape discovered that the biology having the function of stick-reducing, stick-preventing and self-cleaning have a non-smooth surface, the structure on the one hand effectively reducing the contact area between its surface and stick-wet materials, and so reducing chemical absorption points, and on the other hand destroying the continuity of water film, which will produce an air film between its surface and the surface of stick-wet materials to result in a non-stick effect. Based on the structure and shape of biological surfaces, the design idea about bionic non-stick cooking utensils was formed. Based on bionic research of biology surfaces and shapes, we first change the shape of the non-stick cooking utensil (by means of a non-smooth surface), promote water repellency of the cooking utensil surface and reduce contact area between the cooking utensil surface and stick-wet foods. Based on the shape changing of the cooking utensil surface, we further change the character by methods of physics, chemistry, spraying and spattering and the like to spread the cooking utensil surface with metal oxidized film (oxide) or nitrided film not harmful to human bodies and the environment, of a certain thickness. The surface film will further reduce the surface tension of the cooking utensil and prevent direct contact between some metal elements and foods inside the cooking utensil, and also prevent reaction between metal elements and acid alkali in the foods under high temperature, so that people can be prevented from eating too much poisonous metal elements. According to adhesion characteristics between food and the cooking utensil bottom, the non-stick cooking utensil surface structure should be within micron dimensions.

To achieve the above object of the invention, there is provided a non-stick cooking utensil, wherein the inner wall thereof is made to have a non-smooth surface with convex units, the height of the convex units ranges from 20 μm to 999 μm and the projection area of the convex units on the surface of the inner wall ranges from 314 μm² to 783431 μm². The ratio of the total geometrical projection area of the convex units on the base body surface of the inner wall to the area of the base body surface, i.e., the distribution density of the convex units, ranges from 10% to 60%, and a surface film can be formed on the surfaces of the non-smooth convex units.

The convex units can be shaped like a spherical crown, and can also be made with the shape of cylinders, squares, diamonds, rectangles, etc., the dimensions thereof being limited in micron dimensions, such as in the range of 20 to 999 μm. For example, in the case that the convex unit is shaped like a spherical crown, the bottom circle diameter and height of the spherical crown are limited in micron dimensions, in a range from 20 to 999 μm. The distribution density of the convex units, that is the ratio of its total projection area on the base body (i.e., cooking utensil) surface to the base body surface, is 10-60%, and the convex units can be uniformly or randomly distributed. If the convex units are evenly or uniformly distributed, a variety of patterns can be designed. The material to make the non-stick cooking utensil is metal. In order to have a good appearance, prevent the oxidation of metal and prevent excessive harmful metal elements from being taken in by the user (for example, excessive aluminum taken in can lead the increase of senile dementia, osteoporosis, etc., and excessive nickel taken in can lead cancer), a metal film, oxidized film or nitrided film, which is not harmful to the environment and human body, can be formed on the surface of the cooking utensil by physical or chemical methods. The surface film can further reduce the sticking intensity and stickiness between the food and the surface of the cooking utensil. The metal film can be formed by metal materials not as harmful to the environment and human body, such as titanium, chromium and the like. The oxidized film can be oxide formed by phosphor, iron, aluminum, chromium, titanium and the like with oxygen. The nitrided film can be nitride formed by metal and nitrogen. When the inner wall of the cooking utensil is formed to be an non-smooth surface with the convex units, and a surface film with a certain thickness is formed on the non-smooth surface, the effect of detaching of the non-stick cooking utensil will be optimized, and the adhesive strength between food and the inner wall or bottom wall of the cooking utensil will be minimized.

The spherical crown and the like of the invention can be called a protruding type or concave type. If we take the surface of the cooking utensil as the datum plane, the surface convex is called as protruding type; contrarily, there is the concave type.

The non-stick cooking utensil of the invention can be produced by the following method: according to the sticking intensity and stickiness between different foods and cooking utensil surfaces, the convex units with different shapes can be worked out from the inner wall surface of the non-stick cooking utensil. By means of laser processing, machine processing, mould pressing, eroding, sculpting, etc., different convex units can be formed on the cooking utensil surface, and a film can be formed on the cooking utensil surface by means of physical or chemical methods, so that non-stick cooking utensil having better detaching capability and eroding resistance is made.

As compared with the cooking utensil formed by the same material but having a smooth surface, the sticking intensity and stickiness between foods and the inner wall surface of the non-stick cooking utensil of the invention can be reduced by 60-80 percent. This technology has such advantages as: it is simple to process, has stable performance, high-temperature resistance, low cost, and high detaching capability for food. The surface of the cooking utensil is not covered with coat, and the sticking intensity and stickiness between the cooking utensil and food can be reduced by using convex units on the cooking utensil surface, so as to achieve the non-stick effect. While cooking, the convex units do not break off, do not pollute food and do not produce harmful matter to human beings and the environment. The surface film of the non-stick cooking utensil can prevent direct contact between metal elements and foods, and thus prevent the reaction between metal elements and acid or alkali in the foods under high temperature. The invention can not only resolve the adhesion of food and the cooking utensil, but also can resolve adhesion quality of the stick-wet material and the base body. For example, during the course of plastic manufacturing, different convex units are processed on the lumen plastic mould, which can improve detaching quality between the plastic and its mould and makes the plastic product easy to take off.

BRIEF DESCRIPTION OF THE DRAWINGS

FIG. 5 is a schematic view showing yet another distribution style of the convex units on the inner wall surface of the non-stick cooking utensil according to the invention;

FIG. 6 is a schematic view showing the shape of the spherical crown type convex unit of FIG. 5;

FIG. 7 is a schematic view showing another distribution style of the convex units on the inner wall surface of the non-stick cooking utensil according to the invention;

FIG. 8 is a schematic view showing the shape of the spherical crown type convex unit of FIG. 7.

DETAILED DESCRIPTION OF THE PREFERRED EMBODIMENTS

Figure 1:
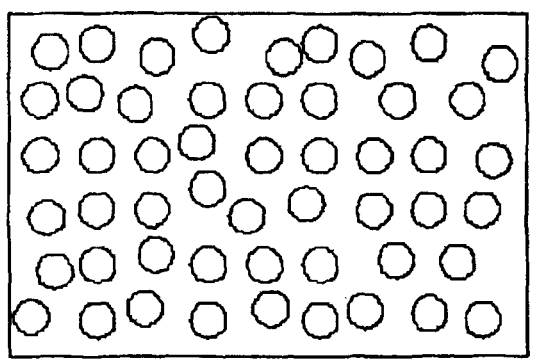
FIG. 1 is a schematic view showing the distribution style of the spherical crown type convex units on the inner wall surface of the non-stick cooking utensil according to the invention.

The non-stick cooking utensil of the invention will be described in detail below by some preferred embodiments of a non-stick pan as an example in conjunction with the accompanying drawings.

The non-stick pan, as a nonrestrictive example of the non-stick cooking utensil of the invention, is manufactured on the basis of a traditional metal (aluminum, stainless steel, iron or steel) pan, and different types of convex units can be formed on the inner surface of the pan wall, based on different adhesive strengths and adhesive abilities between the food and the pan wall, by laser processing, machine processing, mould pressing, eroding, etc. A surface film such as metal film, oxidized film or nitrided film can be formed on the surface of the pan wall by physical or chemical methods. The thickness of the surface film mainly influences the service life of the pan, but it has no influence on the detaching ability of the pan. Therefore, the thickness of the surface film can vary according to practical need, usually not less than 10 μm. According to different performances of the materials used to manufacture the non-stick pan, the oxidized film can be formed by an oxide of aluminum, iron, titanium, chrome, phosphor, etc. The metal film must be formed by metal materials harmless to human beings and the environment, such as titanium, chrome and the like. The nitrided film may be formed by a nitride of metal and nitrogen. The non-stick pan manufactured by the above process exhibits a better detaching capability.

The detailed parameters of different embodiments are listed in the table below:

The parameters of different embodiments

| Embodiment | material of non-stick pan | non-smooth appearance | diameter (microns) | Height (microns) | distribution density (percent) | distribution form | Surface film | Detaching capability (percent) |
|---|---|---|---|---|---|---|---|---|
| 1 | aluminum | spherical crown | 800 | 100 | 60 | random | oxidized film | 78 |
| 2 | steel | spherical crown | 800 | 400 | 60 | regular | titanium film | 62 |
| 3 | aluminum | spherical crown | 500 | 100 | 50 | random | oxidized film | 67 |
| 4 | aluminum | spherical crown | 500 | 300 | 30 | regular | oxidized film | 60 |
| 5 | steel | spherical crown | 500 | 200 | 50 | random | chrome film | 71 |
| 6 | stainless steel | cylinder | 500 | 800 | 50 | random | oxidized film | 78 |
| 7 | cast iron | cylinder | 500 | 20 | 15 | random | oxidized film | 66 |
| 8 | aluminum | cylinder | 500 | 300 | 50 | random | oxidized film | 73 |
| 9 | steel | cylinder | 500 | 300 | 60 | random | chrome film | 63 |
| 10 | aluminum | cylinder | 20 | 20 | 60 | random | oxidized film | 78 |
| 11 | steel | cylinder | 20 | 20 | 20 | uniform | phosphor film | 78 |
| 12 | stainless steel | cylinder | 100 | 100 | 50 | uniform | oxidized film | 65 |
| 13 | aluminum | cylinder | 100 | 200 | 60 | random | oxidized film | 73 |
| 14 | aluminum | cylinder | 100 | 500 | 50 | random | oxidized film | 77 |
| 15 | steel | cylinder | 100 | 800 | 50 | random | titanium film | 66 |
| 16 | aluminum | cylinder | 200 | 800 | 55 | random | oxidized film | 79 |
| 17 | steel | cylinder | 20 | 800 | 50 | random | chrome film | 71 |
| 18 | steel | cylinder | 20 | 500 | 50 | random | phosphatized film | 76 |
| 19 | aluminum | spherical crown | 200 | 20 | 10 | random | oxidized film | 62 |
| 20 | steel | spherical crown | 800 | 300 | 10 | uniform | titanium film | 69 |
| 21 | cast iron | spherical crown | 400 | 100 | 40 | uniform | oxidized film | 77 |
| 22 | aluminum | spherical crown | 200 | 50 | 35 | random | oxidized film | 70 |
| 23 | aluminum | cylinder | 400 | 800 | 10 | uniform | oxidized film | 75 |
| 24 | aluminum | cylinder | 20 | 20 | 10 | uniform | oxidized film | 78 |
| 25 | aluminum | cylinder | 100 | 400 | 40 | random | oxidized film | 69 |
| 26 | steel | cylinder | 999 | 500 | 60 | random | nitrided film | 67 |
| 27 | steel | cylinder | 999 | 200 | 30 | random | nitrided film | 72 |
| 28 | aluminum | cylinder | 200 | 999 | 10 | random | oxidized film | 80 |

Embodiment 1

Figure 2:
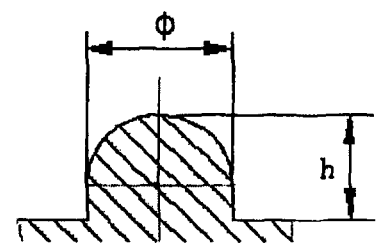
FIG. 2 is a schematic view showing the shape of the spherical crown type convex unit of FIG. 1.

As shown in FIGS. 1 and 2, take the material of the non-stick pan (hereinafter referred to as a non-stick cooking utensil) as aluminum. On the inner wall surfaces of the non-stick cooking utensil are convex units, whose appearance looks like a spherical crown. The bottom circle diameter ($\phi$) of the spherical crown is 800 μm (the projection area on the inner wall surface is 502400 μm$^2$) and the height h thereof is 100 μm. The ratio of the total geometrical projection area of the convex units on the base body surface to the area of the base body surface, i.e., the distribution density of the convex units, is 60%. The convex units are distributed at random on the inner wall surface. An oxidized film can be formed on the inner wall surfaces of the cooking utensil. As compared with a cooking utensil formed by the same material but with a smooth surface, the sticking intensity and stickiness between food and the inner wall surfaces can be reduced by about 78%.

Embodiment 2

Figure 3:
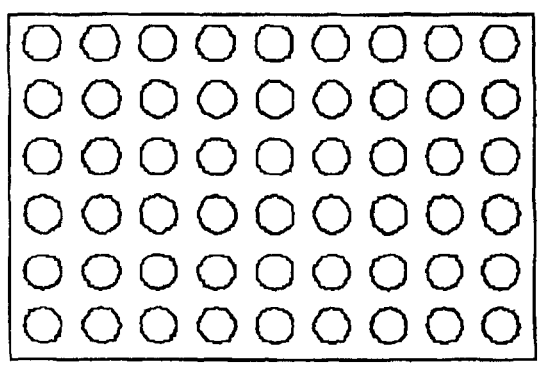
FIG. 3 is a schematic view showing another distribution style of the convex units on the inner wall surface of the non-stick cooking utensil according to the invention.
Figure 4:
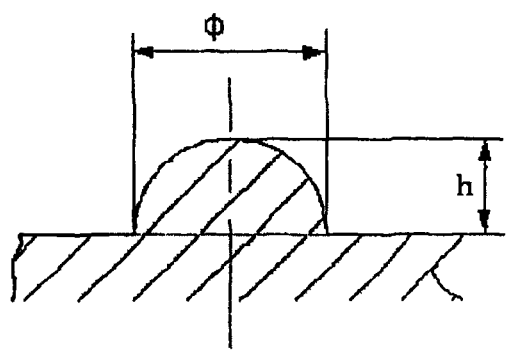
FIG. 4 is a schematic view showing the shape of the spherical crown type convex unit of FIG. 3.

As shown in FIGS. 3 and 4, take the material of the non-stick cooking utensil as steel. On the inner wall surfaces of the cooking utensil are convex units, whose appearance looks like a spherical crown. The bottom circle diameter ($\phi$) of the spherical crown is 800 μm and the height h thereof is 400 μm. The ratio of the total geometrical projection area of the convex units on the base body surface to the area of the base body surface, i.e., the distribution density of the convex units, is 60%. The convex units are regularly distributed in the form of grid. A metallic titanium film can be formed on the inner wall surfaces of the cooking utensil. As compared with a cooking utensil formed by the same material but with a smooth surface, the sticking intensity and stickiness between food and the inner wall surfaces can be reduced by about 62%.

Embodiment 3

As shown in FIGS. 5 and 6, take the material of the non-stick cooking utensil as aluminum. On the inner wall surfaces of the cooking utensil are convex units, whose appearance looks like a spherical crown. The bottom circle diameter ($\phi$) of the spherical crown is 500 μm and the height h thereof is 100 μm. The ratio of the total geometrical projection area of the convex units on the base body surface to the area of the base body surface, i.e., the distribution density of the convex units, is 50%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 67%.

Embodiment 4

As shown in FIGS. 7 and 8, take the material of the non-stick cooking utensil as aluminum. On the inner wall surfaces of the cooking utensil are convex units, whose appearance looks like a spherical crown. The bottom circle diameter (φ) of the spherical crown is 500 μm and the height h thereof is 300 μm. The ratio of the total geometrical projection area of the convex units on the base body surface to the area of the base body surface, i.e., the distribution density of the convex units, is 30%. The convex units are regularly distributed. An oxidized film can be formed on the inner wall surfaces of the cooking utensil. As compared with a cooking utensil formed by the same material but with a smooth surface, the sticking intensity and stickiness between food and the inner wall surfaces can be reduced by about 60%.

Embodiment 5

As shown in FIGS. 1 and 2, take the material of the non-stick cooking utensil as steel. On the inner wall surfaces of the cooking utensil are convex units, whose appearance looks like a spherical crown. The bottom circle diameter (φ) of the spherical crown is 500 μm and the height h thereof is 200 μm. The ratio of the total geometrical projection area of the convex units on the base body surface to the area of the base body surface, i.e., the distribution density S of the convex units on the inner wall surface, is 50%. The convex units are distributed at random. A metal chromic film can be formed on the inner wall surfaces of the cooking utensil. As compared with a cooking utensil formed by the same material but with a smooth surface, the sticking intensity and stickiness between food and the inner wall surfaces can be reduced by about 78%.

Embodiment 6

Take the material of the non-stick cooking utensil as steel. On the inner wall surfaces of the cooking utensil are convex units, whose appearance looks like a cylinder. The diameter of the cylinder is 500 μm and the height thereof is 800 μm. The ratio of the total geometrical projection area of the convex units on the base body surface to the area of the base body surface, i.e., the distribution density S of the convex units on the inner wall surface, is 50%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 78%.

Embodiment 7

Take the material of the non-stick cooking utensil as cast iron. On the inner wall surfaces of the cooking utensil are convex units, whose appearance looks like a cylinder. The diameter of the cylinder is 500 μm and the height thereof is 20 μm. The ratio of the total geometrical projection area of the convex units on the base body surface to the area of the base body surface, i.e., the distribution density S of the convex units on the inner wall surface, is 15%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 66%.

Embodiment 8

Take the material of the non-stick cooking utensil as aluminum. On the inner wall surfaces of the cooking utensil are convex units, whose appearance looks like a cylinder. The diameter of the cylinder is 500 μm and the height thereof is 300 μm. The ratio of the total geometrical projection area of the convex units on the base body surface to the area of the base body surface, i.e., the distribution density S of the convex units on the inner wall surface, is 50%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 73%.

Embodiment 9

Take the material of the non-stick cooking utensil as steel. On the inner wall surfaces of the cooking utensil are convex units, whose appearance looks like a cylinder. The diameter of the cylinder is 500 μm and the height thereof is 300 μm. The ratio of the total geometrical projection area of the convex units on the base body surface to the area of the base body surface, i.e., the distribution density S of the convex units on the inner wall surface, is 60%. The convex units are distributed at random. A metallic chrome film can be formed on the inner wall surfaces of the cooking utensil. As compared with a cooking utensil formed by the same material but with a smooth surface, the sticking intensity and stickiness between food and the inner wall surfaces can be reduced by about 63%.

Embodiment 10

Take the material of the non-stick cooking utensil as aluminum. On the inner wall surfaces of the cooking utensil are convex units, whose appearance looks like a cylinder. The diameter of the cylinder is 20 μm and the height thereof is 20 μm. The ratio of the total geometrical projection area of the convex units on the base body surface to the area of the base body surface, i.e., the distribution density S of the convex units on the inner wall surface, is 60%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 78%.

Embodiment 11

Take the material of the non-stick cooking utensil as steel. On the inner wall surfaces of the cooking utensil are convex units, whose appearance looks like a cylinder. The diameter of the cylinder is 20 μm and the height thereof is 20 μm. The ratio of the total geometrical projection area of the convex units on the base body surface to the area of the base body surface, i.e., the distribution density S of the convex units on the inner wall surface, is 20%. The convex units are distributed evenly or uniformly. A phosphatized film can be formed on the inner wall surfaces of the cooking utensil. As compared with a cooking utensil formed by the same material but with a smooth surface, the sticking intensity and stickiness between food and the inner wall surfaces can be reduced by about 78%.

Embodiment 12

Take the material of the non-stick cooking utensil as steel. On the inner wall surfaces of the cooking utensil are convex units, whose appearance looks like a cylinder. The diameter of the cylinder is 100 μm and the height thereof is 100 μm. The ratio of the total geometrical projection area of the convex units on the base body surface to the area of the base body surface, i.e., the distribution density S of the convex units on the inner wall surface, is 50%. The convex units are distributed evenly or uniformly. An oxidized film can be formed on the inner wall surfaces of the cooking utensil. As compared with a cooking utensil formed by the same material but with a smooth surface, the sticking intensity and stickiness between food and the inner wall surfaces can be reduced by about 65%.

Embodiment 13

Take the material of the non-stick cooking utensil as aluminum. On the inner wall surfaces of the cooking utensil are convex units, whose appearance looks like a cylinder. The diameter of the cylinder is 100 μm and the height thereof is 200 μm. The ratio of the total geometrical projection area of the convex units on the base body surface to the area of the base body surface, i.e., the distribution density S of the convex units on the inner wall surface, is 60%. The convex units are distributed at random. An oxidized film can be formed on the inner wall surfaces of the cooking utensil. As compared with s cooking utensil formed by the same material but with a smooth surface, the sticking intensity and stickiness between food and the inner wall surfaces can be reduced by about 73%.

Embodiment 14

Take the material of the non-stick cooking utensil as aluminum. On the inner wall surfaces of the cooking utensil are convex units, whose appearance looks like a cylinder. The diameter of the cylinder is 100 μm and the height thereof is 500 μm. The ratio of the total geometrical projection area of the convex units on the base body surface to the area of the base body surface, i.e., the distribution density S of the convex units on the inner wall surface, is 50%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 77%.

Embodiment 15

Take the material of the non-stick cooking utensil as steel. On the inner wall surfaces of the cooking utensil are convex units, whose appearance looks like a cylinder. The diameter of the cylinder is 100 μm and the height thereof is 800 μm. The ratio of the total geometrical projection area of the convex units on the base body surface to the area of the base body surface, i.e., the distribution density S of the convex units on the inner wall surface, is 50%. The convex units are distributed at random. A metal titanium film can be formed on the inner wall surfaces of the cooking utensil. As compared with a cooking utensil formed by the same material but with a smooth surface, the sticking intensity and stickiness between food and the inner wall surfaces can be reduced by about 66%.

Embodiment 16

Take the material of the non-stick cooking utensil as aluminum. On the inner wall surfaces of the cooking utensil are convex units, whose appearance looks like a cylinder. The diameter of the cylinder is 200 μm and the height thereof is 800 μm. The ratio of the total geometrical projection area of the convex units on the base body surface to the area of the base body surface, i.e., the distribution density S of the convex units on the inner wall surface, is 55%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 79%.

Embodiment 17

Take the material of the non-stick cooking utensil as steel. On the inner surfaces of the cooking utensil are convex units, whose appearance looks like a cylinder. The diameter of the cylinder is 20 μm and the height thereof is 800 μm. The ratio of the total geometrical projection area of the convex units on the base body surface to the area of the base body surface, i.e., the distribution density S of the convex units on the inner wall surface, is 50%. The convex units are distributed at random. A metal chrome film can be formed on the inner wall surfaces of the cooking utensil. As compared with a cooking utensil formed by the same material but with a smooth surface, the sticking intensity and stickiness between food and the inner wall surfaces can be reduced by about 71%.

Embodiment 18

Take the material of the non-stick cooking utensil as steel. On the inner wall surfaces of the cooking utensil are convex units, whose appearance looks like a cylinder. The diameter of the cylinder is 20 μm and the height thereof is 500 μm. The ratio of the total geometrical projection area of the convex units on the base body surface to the area of the base body surface, i.e., the distribution density S of the convex units on the inner wall surface, is 50%. The convex units are distributed at random. A phosphatized film can be formed on the inner wall surfaces of the cooking utensil. As compared with a cooking utensil formed by the same material but with a smooth surface, the sticking intensity and stickiness between food and the inner wall surfaces can be reduced by about 76%.

Embodiment 19

As shown in FIGS. 1 and 2, take the material of the non-stick pan as aluminum. On the inner wall surfaces of the cooking utensil are convex units, whose appearance looks like a spherical crown. The bottom circle diameter (ϕ) of the spherical crown is 200 μm and the height h thereof is 20 μm. The ratio of the total geometrical projection area of the convex units on the base body surface to the area of the base body surface, i.e., the distribution density of the convex units, is 10%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 62%.

Embodiment 20

As shown in FIGS. 7 and 8, take the material of the non-stick cooking utensil as steel. On the inner wall surfaces of the cooking utensil are convex units, whose appearance looks like a spherical crown. The bottom circle diameter (ϕ)of the spherical crown is 800 μm and the height h thereof is 300 μm. The ratio of the total geometrical projection area of the convex units on the base body surface to the area of the base body surface, i.e., the distribution density of the convex units, is 10%. The convex units are distributed evenly or uniformly. A metal titanium film can be formed on the inner wall surfaces of the cooking utensil. As compared with ah cooking utensil formed by the same material but with a smooth surface, the sticking intensity and stickiness between food and the inner wall surfaces can be reduced by about 69%.

Embodiment 21

As shown in FIGS. 7 and 8, take the material of the non-stick cooking utensil as cast iron. On the inner wall surfaces of the cooking utensil are convex units, whose appearance looks like a spherical crown. The bottom circle diameter (ϕ)of the spherical crown is 400 μm and the height h thereof is 100 μm. The ratio of the total geometrical projection area of the convex units on the base body surface to the area of the base body surface, i.e., the distribution density of the convex units, is 40%. The convex units are distributed evenly or uniformly. An oxidized film can be formed on the inner wall surfaces of the cooking utensil. As compared with a cooking utensil formed by the same material but with a smooth surface, the sticking intensity and stickiness between food and the inner wall surfaces can be reduced by about 77%.

Embodiment 22

As shown in FIGS. 1 and 2, take the material of the non-stick cooking utensil as aluminum. On the inner wall surfaces of the cooking utensil are convex units, whose appearance looks like a spherical crown. The bottom circle diameter (ϕ)of the spherical crown is 200 μm and the height h thereof is 50 μm. The ratio of the total geometrical projection area of the convex units on the base body surface to the area of the base body surface, i.e., the distribution density of the convex units, is 35%. The convex units are distributed at random. An oxidized film can be formed on the inner wall surfaces of the cooking utensil. As compared with a cooking utensil formed by the same material but with a smooth surface, the sticking intensity and stickiness between food and the inner wall surfaces can be reduced by about 70%.

Embodiment 23

Take the material of the non-stick cooking utensil as aluminum. On the inner wall surfaces of the cooking utensil are convex units, whose appearance looks like a cylinder. The diameter of the cylinder is 400 μm and the height thereof is 800 μm. The ratio of the total geometrical projection area of the convex units on the base body surface to the area of the base body surface, i.e., the distribution density S of the convex units on the inner wall surface, is 10%. The convex units are distributed evenly or uniformly. An oxidized film can be formed on the inner wall surfaces of the cooking utensil. As compared with a cooking utensil formed by the same material but with a smooth surface, the sticking intensity and stickiness between food and the inner wall surfaces can be reduced by about 75%.

Embodiment 24

Take the material of the non-stick cooking utensil as aluminum. On the inner wall surfaces of the cooking utensil are convex units, whose appearance looks like a cylinder. The diameter of the cylinder is 20 μm and the height thereof is 20 μm. The ratio of the total geometrical projection area of the convex units on the base body surface to the area of the base body surface, i.e., the distribution density S of the convex units on the inner wall surface, is 10%. The convex units are distributed evenly or uniformly. An oxidized film can be formed on the inner wall surfaces of the cooking utensil. As compared with a cooking utensil formed by the same material but with a smooth surface, the sticking intensity and stickiness between food and the inner wall surfaces can be reduced by about 78%.

Embodiment 25

Take the material of the non-stick cooking utensil as aluminum. On the inner wall surfaces of the cooking utensil are convex units, whose appearance looks like a cylinder. The diameter of the cylinder is 100 μm and the height thereof is 400 μm. The ratio of the total geometrical projection area of the convex units on the base body surface to the area of the base body surface, i.e., the distribution density S of the convex units on the inner wall surface, is 40%. The convex units are distributed at random. An oxidized film can be formed on the inner wall surfaces of the cooking utensil by processing. As compared with a cooking utensil formed by the same material but with a smooth surface, the sticking intensity and stickiness between food and the inner wall surfaces can be reduced by about 69%.

Embodiment 26

Take the material of the non-stick cooking utensil as steel. On the inner wall surfaces of the cooking utensil are convex units, whose appearance looks like a cylinder. The diameter of the cylinder is 999 μm and the height thereof is 500 μm. The ratio of the total geometrical projection area of the convex units on the base body surface to the area of the base body surface, i.e., the distribution density S of the convex units on the inner wall surface, is 60%. The convex units are distributed at random. A nitrided film can be formed on the inner wall surfaces of the cooking utensil by processing. As compared with a cooking utensil formed by the same material but with a smooth surface, the sticking intensity and stickiness between food and the inner wall surfaces can be reduced by about 67%.

Embodiment 27

Take the material of the non-stick cooking utensil as steel. On the inner wall surfaces of the cooking utensil are convex units, whose appearance looks like a cylinder. The diameter of the cylinder is 999 μm and the height thereof is 200 μm. The ratio of the total geometrical projection area of the convex units on the base body surface to the area of the base body surface, i.e., the distribution density S of the convex units on the inner wall surface, is 30%. The convex units are distributed at random. A nitrided film can be formed on the inner wall surfaces of the cooking utensil by processing. As compared with a cooking utensil formed by the same material but with a smooth surface, the sticking intensity and stickiness between food and the inner wall surfaces can be reduced by about 72%.

Embodiment 28

Take the material of the non-stick cooking utensil as aluminum. On the inner wall surfaces of the cooking utensil are convex units, whose appearance looks like a cylinder. The diameter of the cylinder is 200 μm and the height thereof is 999 μm. The ratio of the total geometrical projection area of the convex units on the base body surface to the area of the base body surface, i.e., the distribution density S of the convex units on the inner wall surface, is 10%. The convex units are distributed at random. An oxidized film can be formed on the inner wall surfaces of the cooking utensil by processing. As compared with a cooking utensil formed by the same material but with a smooth surface, the sticking intensity and stickiness between food and the inner wall surfaces can be reduced by about 80%.

The non-smooth surfaces with convex units of different shapes and distributions on the inner wall surfaces of the non-stick cooking utensil as exemplified in the above-mentioned embodiments are only given to illustrate the mechanism of the non-stick cooking utensil of the invention. Obviously, the convex units (which make the cooking utensil surface non-smooth) can be distributed at random or regularly on the cooking utensil inner surfaces in a variety of ways according to the practical need, and it is hard or unnecessary to list all kinds of examples. Therefore, the description on the above embodiments should not be regarded as a limitation to the scope of the invention. Moreover, it is obvious that other than pans, the invention can also be applied conveniently to any other types of cooking utensil, which will not be listed one by one here.

What is claimed is:

1. A non-stick cooking utensil having inner walls, wherein the inner walls have a non-smooth surface with convex units, the height (h) of the units ranges from 20 μm to 999 μm and the projection area of the convex units on the surface of the inner wall ranges from 314 μm$^2$ to 783431 μm$^2$, wherein each convex unit has a spherical crown shape that includes a spherical portion on top of a cylindrical portion, and a bottom circle diameter (φ) of the spherical crown ranges from 20 μm to 999 μm, wherein the distribution density of the convex units, defined as the ratio of the total geometrical projection area of the convex units on the base body surface of the inner wall to the area of the base body surface, ranges from 10% to 60%; and wherein an oxidized surface film is formed on the surfaces of the non-smooth convex units.

2. The non-stick cooking utensil of claim 1, wherein each convex unit is shaped like a cylinder, and the diameter (φ) of the cylinder ranges from 20 μm to 999 μm.

3. The non-stick cooking utensil of claim 1, wherein the oxidized surface film is formed by materials selected from the group consisting of phosphor, iron, aluminum, chromium and titanium.

4. The non-stick cooking utensil of claim 1, wherein the surface film is a phosphatized film.

5. The non-stick cooking utensil of claim 1, wherein the surface film is a metal film having at least one of titanium and chromium, or a nitrided film of metal and nitrogen.

* * * * *